US007962797B2

(12) United States Patent
Goldszmidt et al.

(10) Patent No.: US 7,962,797 B2
(45) Date of Patent: Jun. 14, 2011

(54) AUTOMATED HEALTH MODEL GENERATION AND REFINEMENT

(75) Inventors: Moises Goldszmidt, Palo Alto, CA (US); Peter Bodik, Berkeley, CA (US); Hans Christian Andersen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 12/408,570

(22) Filed: Mar. 20, 2009

(65) Prior Publication Data

US 2010/0241903 A1 Sep. 23, 2010

(51) Int. Cl.
G06F 11/00 (2006.01)
(52) U.S. Cl. .............................. 714/37; 714/25; 714/39
(58) Field of Classification Search .................... 714/37, 714/38, 25, 26, 39
See application file for complete search history.

(56) References Cited

U.S. PATENT DOCUMENTS

| | | | |
|---|---|---|---|
| 6,907,416 B2 | 6/2005 | Tasooji et al. | |
| 7,020,802 B2* | 3/2006 | Gross et al. | 714/39 |
| 7,184,935 B1 | 2/2007 | Cohen et al. | |
| 7,243,265 B1* | 7/2007 | Wookey et al. | 714/37 |
| 7,519,860 B2* | 4/2009 | Hatonen et al. | 714/26 |
| 2005/0125710 A1* | 6/2005 | Sanghvi | 714/39 |
| 2005/0228880 A1* | 10/2005 | Champlin | 709/224 |
| 2006/0015597 A1* | 1/2006 | Scott et al. | 709/223 |
| 2006/0229931 A1 | 10/2006 | Fligler et al. | |
| 2007/0192150 A1* | 8/2007 | Belkin et al. | 705/7 |
| 2007/0294591 A1* | 12/2007 | Usynin et al. | 714/45 |
| 2008/0046559 A1 | 2/2008 | Langer et al. | |
| 2008/0103729 A1 | 5/2008 | Barham et al. | |
| 2008/0163015 A1* | 7/2008 | Kagan et al. | 714/724 |
| 2008/0209030 A1 | 8/2008 | Goldszmidt et al. | |
| 2010/0121776 A1* | 5/2010 | Stenger | 705/347 |
| 2010/0306597 A1* | 12/2010 | Goldszmidt et al. | 714/47 |

OTHER PUBLICATIONS

Bowring, James F., et al., "TRIP WIRE: Mediating Software Self-Awareness", Second International Workshop on Remote Analysis and Measurement of Software Systems (RAMSS 04)—W15S Workshop—26th International Conference on Software Engineering (2004/915), 2004, p. 11-14.

Yairi, Takehisa, et al., "Telemetry-mining: A Machine Learning Approach to Anomaly Detection and Fault Diagnosis for Space Systems", 2nd IEEE International Conference on Space Mission Challenges for Information Technology (SMC-IT'06), 2006, 8 pages.

Avin, Mathew, et al., "Reducing maintenance cost through effective prediction analysis and process integration", Advances in Vibration Engineering 5(2): pp. 87-96, 2006.

(Continued)

*Primary Examiner* — Philip Guyton
(74) *Attorney, Agent, or Firm* — Workman Nydegger

(57) ABSTRACT

The present invention extends to methods, systems, and computer program products for automatically generating and refining health models. Embodiments of the invention use machine learning tools to analyze historical telemetry data from a server deployment. The tools output fingerprints, for example, small groupings of specific metrics-plus-behavioral parameters, that uniquely identify and describe past problem events mined from the historical data. Embodiments automatically translate the fingerprints into health models that can be directly applied to monitoring the running system. Fully-automated feedback loops for identifying past problems and giving advance notice as those problems emerge in the future is facilitated without any operator intervention. In some embodiments, a single portion of expert knowledge, for example, Key Performance Indicator (KPI) data, initiates health model generation. Once initiated, the feedback loop can be fully automated to access further telemetry and refine health models based on the further telemetry.

20 Claims, 4 Drawing Sheets

OTHER PUBLICATIONS

Gabriel, Richard P., et al., "Conscientious Software", Proceedings of the 2006 OOPSLA Conference, Oct. 2006, pp. 433-450.

Mao, Yun, et al., "Automated Computer System Diagnosis by Machine Learning Approaches", Aug. 2005, 31 pages.

* cited by examiner

AUTOMATED HEALTH MODEL GENERATION AND REFINEMENT

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, large numbers of servers are deployed, such as, for example, within an organization or in a "cloud", to provide a software service. For example, a number of servers can be grouped to provide third party scanning of electronic messages for SPAM, viruses, and other security threats.

Human administrators or network operators can monitor a group of servers to ensure that that are performing their function, such as, for example, scanning electronic messages in a timely manner. Some monitoring techniques use a health-model based approach. Server applications are made to expose various pieces of telemetry (i.e., data about their running state). An application's author defines a health model as a set of rules that use the available telemetry to determine whether the system is "healthy", and to alert operators if the deployment is not operating within expected parameters. By using the term "system" we include hardware, middleware and software components that enable the delivery of the software service.

However for more complex systems, it can be very difficult to author an effective health model that generates truly actionable alerts with a low rate of false positives. Software applications (and their infrastructure) often have dozens of pieces of exposed telemetry, and the relationships between those exposed measures and the actual health of the system is often difficult to understand. As a result, there is often a disconnect between what the health model author believes is relevant to observe, and what will actually prove useful in the field.

Further, for many monitoring techniques health model generation is a human-intensive process. An expert (e.g., the application developer) considers the design of a software service and uses there expertise to create a health model. After a crisis event in which an unexpected problem occurs and is resolved, there is often an opportunity for the system expert to do a post-mortem investigation, and use historical telemetry data to try to understand how to better detect the problem in the future. Both of these methods are time-intensive.

A further difficulty in many environments is that an administrator or network operator monitoring a software service typically has less expertise than the application developer. Thus when an unexpected problem occurs, the administrator or network operator may lack the skills to analyze telemetry data to improve the ability to detect the problem in the future. As such, the administrator or network operator addresses the problem as best they can, knowing that it will likely recur or attempts to contact the application developer or other application expert to obtain further information. However, changes to a health model may not occur for some time, if at all, based on when the application developer or application expert can review the telemetry.

Further, most health models are direct to determine the current health of a software service. That is, most health models are focused on answering the question "Is the software healthy right now?" However, for many problems, there is often at least some lag time between when the problem truly starts and when the health model alerts. Further, there is also typically some lag time between when the problem begins to resolve and when the health model ends the alert. As a result, health models potential overlook or fail to consider the importance of telemetry data prior to and/or after an alert that may provide increased understanding of a problem.

BRIEF SUMMARY

The present invention extends to methods, systems, and computer program products for automatically generating and refining health models. Embodiments of the invention can be used in server deployments, such as, for example, in a "cloud" arrangement (although embodiments are equally applicable to server deployments that are not in a close arrangement). In some embodiments a computer system generates a health model for a software service. The computer system accesses historical telemetry data for the software service. The historical telemetry data having been generated by a plurality of application servers during interoperation between the plurality of applications servers to perform a primary function of the software service. The historical telemetry data includes telemetry data values for various monitored characteristics of the software service.

The computer system accesses Key Performance Indicator ("KPI") data for the software service. The KPI data identifies one or more KPI telemetry counters and corresponding KPI thresholds used to determine if the software service is adequately performing a primary function. Accordingly, when data values for KPI telemetry counters satisfy the corresponding KPI thresholds, the software service is adequately performing the primary function. On the other hand, when a data value for any KPI telemetry counter does not satisfy a corresponding KPI threshold, the software service is not adequately performing the primary function.

The computer system analyzes the historical telemetry data for the software service to identify any prior problem events when a data value for a KPI telemetry counter did not satisfy a corresponding KPI threshold for some period of time. For each identified problem event, the computer system creates a problem fingerprint for each identified problem event. Problem fingerprint creation includes identifying a subset of other telemetry counters relevant to the KPI telemetry counter from within historical telemetry data. Problem fingerprint creation also includes accessing corresponding data values for the other telemetry counters for at least during the period of time when the data value of the KPI telemetry value did not satisfy the corresponding KPI threshold. Problem fingerprint creation also includes combining the subset of other telemetry counters and corresponding data values as a problem fingerprint to detect future occurrences of the identified problem event when the software service is not adequately performing the primary function and can determine whether a future problem event resembles a past problem event.

For each identified problem event, the computer system automatically and without user intervention, subsequently uses the problem fingerprint to generate a health model for the software service. The generated health model is configured to monitor the software service to detect further occurrences of the software service not adequately performing the primary function.

In other embodiments, a computer system refines a health model for a software service. The computer system accesses telemetry data for the software service. The telemetry data is generated by a plurality of application servers during interoperation between the plurality of applications servers to perform a primary function of the software service. The telemetry data includes data values for telemetry counters representing various monitored characteristics of the software service.

The computer system accesses a health model for the software service. The health model is configured to monitor the software service to detect one or more problem events. A problem event is detected when data values for one or more corresponding telemetry counters satisfy behavioral parameters in a problem fingerprint that was generated from one or more prior occurrences of the problem event.

The computer system detects a subsequent occurrence of a problem event in the accessed telemetry data. The problem event is detected based on the accessed telemetry data indicating that data values for the one or more corresponding telemetry counters satisfied behavioral parameters in the problem fingerprint for a period of time. The computer system analyzes the telemetry data during the time period to obtain data values for the one or more corresponding telemetry counters during the time period.

The computer system refines the problem fingerprint for the problem event based on the data values obtained during the time period and potentially also based on data values obtained during non-problem time periods. The refinement includes combining the data values with the behavioral parameters in the problem fingerprint. The behavioral parameters are refined into a refined problem fingerprint that more precisely detects occurrences of the problem event. The computer system, automatically and without user intervention, subsequently uses the refined problem fingerprint to refine the health model for the software service. The refined health model is configured to monitor the software service to more precisely detect further occurrences of the problem event.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
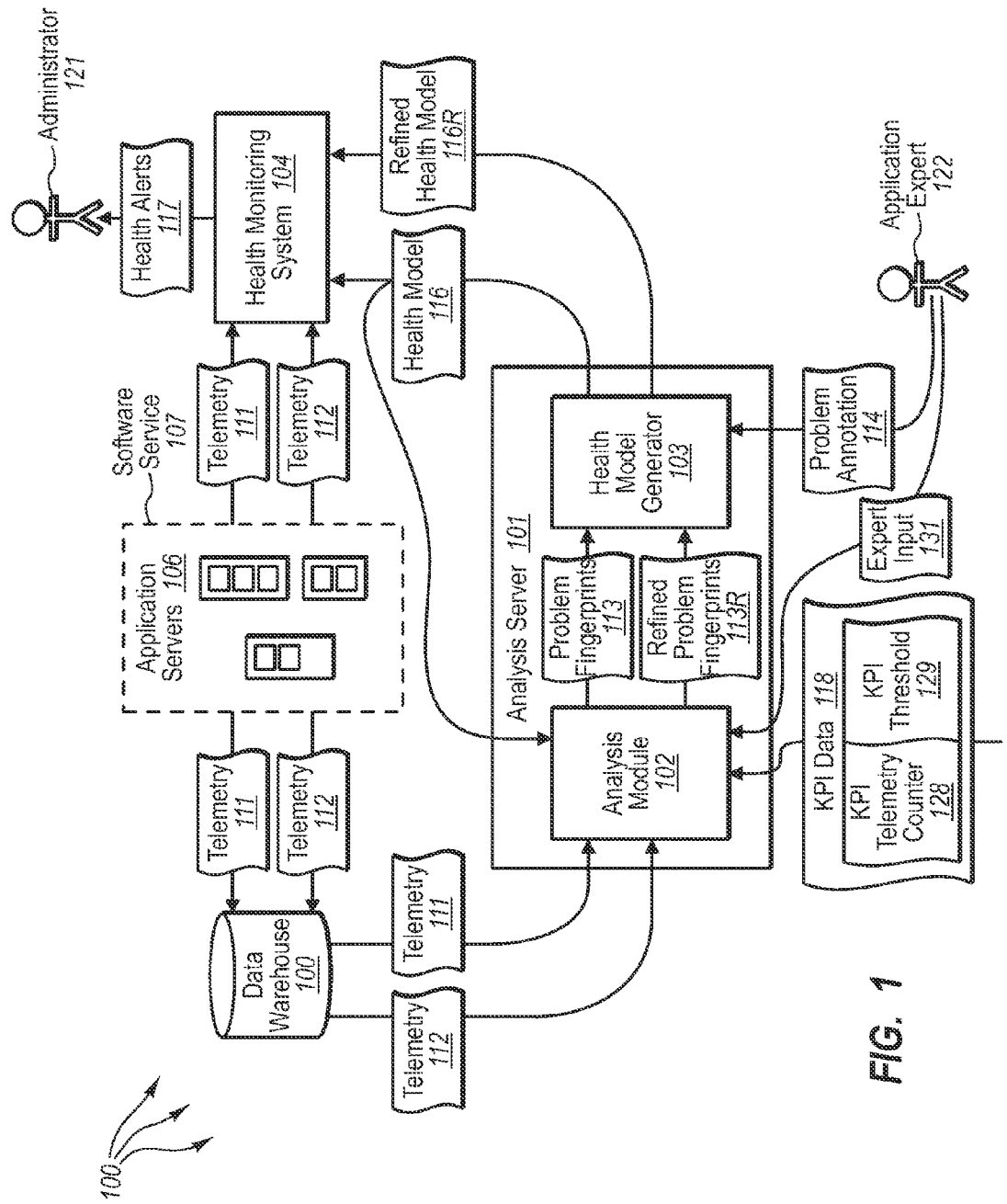
FIG. 1 illustrates an example computer architecture that facilitates automated health model generation and refinement.

The present invention extends to methods, systems, and computer program products for automatically generating and refining health models. Embodiments of the invention can be used in server deployments, such as, for example, in a "cloud" arrangement (although embodiments are equally applicable to server deployments that are not in a close arrangement). In some embodiments a computer system generates a health model for a software service. The computer system accesses historical telemetry data for the software service. The historical telemetry data having been generated by a plurality of application servers during interoperation between the plurality of applications servers to perform a primary function of the software service. The historical telemetry data includes telemetry data values for various monitored characteristics of the software service.

The computer system accesses Key Performance Indicator ("KPI") data for the software service. The KPI data identifies one or more KPI telemetry counters and corresponding KPI thresholds used to determine if the software service is adequately performing a primary function. Accordingly, when data values for KPI telemetry counters satisfy the corresponding KPI thresholds, the software service is adequately performing the primary function. On the other hand, when a data value for any KPI telemetry counter does not satisfy a corresponding KPI threshold, the software service is not adequately performing the primary function.

The computer system analyzes the historical telemetry data for the software service to identify any prior problem events when a data value for a KPI telemetry counter did not satisfy a corresponding KPI threshold for some period of time. For each identified problem event, the computer system creates a problem fingerprint for each identified problem event. Problem fingerprint creation includes identifying a subset of other telemetry counters relevant to the KPI telemetry counter from within historical telemetry data. Problem fingerprint creation also includes accessing corresponding data values for the other telemetry counters for at least during the period of time when the data value of the KPI telemetry value did not satisfy the corresponding KPI threshold. Problem fingerprint creation also includes combining the subset of other telemetry counters and corresponding data values as a problem fingerprint to detect future occurrences of the identified problem event when the software service is not adequately performing the primary function and can determine whether a future problem event resembles a past problem event.

For each identified problem event, the computer system automatically and without user intervention, subsequently uses the problem fingerprint to generate a health model for the software service. The generated health model is configured to monitor the software service to detect further occurrences of the software service not adequately performing the primary function.

In other embodiments, a computer system refines a health model for a software service. The computer system accesses telemetry data for the software service. The telemetry data is generated by a plurality of application servers during inter-operation between the plurality of applications servers to perform a primary function of the software service. The telemetry data includes data values for telemetry counters representing various monitored characteristics of the software service.

The computer system accesses a health model for the software service. The health model is configured to monitor the software service to detect one or more problem events. A problem event is detected when data values for one or more corresponding telemetry counters satisfy behavioral parameters in a problem fingerprint that was generated from one or more prior occurrences of the problem event.

The computer system detects a subsequent occurrence of a problem event in the accessed telemetry data. The problem event is detected based on the accessed telemetry data indicating that data values for the one or more corresponding telemetry counters satisfied behavioral parameters in the problem fingerprint for a period of time. The computer system analyzes the telemetry data during the time period to obtain data values for the one or more corresponding telemetry counters during the time period.

The computer system refines the problem fingerprint for the problem event based on the data values obtained during the time period and potentially also based on data values obtained during non-problem time periods. The refinement includes combining the data values with the behavioral parameters in the problem fingerprint. The behavioral parameters are refined into a refined problem fingerprint that more precisely detects occurrences of the problem event. The computer system, automatically and without user intervention, subsequently uses the refined problem fingerprint to refine the health model for the software service. The refined health model is configured to monitor the software service to more precisely detect further occurrences of the problem event.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations that include at least a processor and system memory such as, for example, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates automated health model generation and refinement. Referring to FIG. 1, computer architecture 100 includes analysis server 101, health monitoring system 104, software service, and data warehouse 108. Each of the depicted components is connected to one another over (or is part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol ("SOAP"), etc.) over the network.

Software service 107, such as, for example, an electronic message scanning service, is provided through the interoperation of application servers 106. For example, application servers 106 can interoperate to scan electronic messages for SPAM, viruses, or other unwanted code and/or data. During interoperation, application servers can output telemetry (in essentially real-time) indicating various characteristics of application servers 106 and/or software service 107 and their corresponding data values. In some embodiments, telemetry (e.g., telemetry 111) includes name/value pairs indicating a characteristic and its corresponding value, such as, for example, Network Error Rate=5, Data Throughput=100, etc.

Health monitoring system 104 is generally configured to monitor telemetry from a software service and alert operators if a problem even is detected. For example, health monitoring system 104 can monitor telemetry 111 in essentially real-time in accordance with a health model, such as, for example, health model 116. The health model can indicate to health monitoring system 104 that it is to look for one or more different combinations of telemetry data values. Each different combination of telemetry values can indicate a problem event at a software service, such as, for example, software service 107. When a problem event is detected, health monitoring system 104 can send a health alert, such as, for example, health alert 117, to an administrator, such as, for example, administrator 121.

Data warehouse 108 is generally configured as a database or other storage solution that stores historical logs of telemetry data from software services. For example, software service 107 can send telemetry 111 to data warehouse 108 for storage (essentially simultaneously with sending telemetry 111 to health monitoring system 104). From time to time, at designated intervals, or in response to a detected problem event, an application developer or application expert, such as, for example, application expert 122, can review telemetry stored at data warehouse 108.

Analysis server 101 includes analysis module 102 and health model generator 103. Analysis module 102 is generally configured to access telemetry data for data warehouse 107, such as, for example in real-time or through periodic batch updates. Analysis server can combine telemetry along with other data to formulate problem fingerprints for software service events. In some embodiments, for example, when generating a health model, problem fingerprints are formulated from telemetry data and Key Performance Indicator ("KPI") data.

KPI data can identify a single piece of telemetry (which hereinafter may be referred to as a KPI telemetry counter) for a software service. KPI data can also include a KPI threshold or range value. A KPI telemetry counter can be monitored in view of its corresponding KPI threshold or range to determine if a software service is, broadly speaking, adequately performing its intended role or primary function (e.g., scanning electronic messages in a timely manner).

Analysis module 102 can analyze telemetry to identify time periods within the telemetry when a KPI threshold or range is not satisfied and thus inadequate performance is indicated (which hereinafter may be referred to as a "problem event"). Analysis module 102 can also identify a subset of other telemetry counters relevant to the KPI telemetry counter. For example, if a KPI telemetry counter was data throughput, analysis module 102 may identify data throughput variability, network latency, and network error rate as other relevant telemetry counters. Analysis module 102 can then access telemetry data values for the subset of relevant telemetry counters for the identified time periods. That is, during indicated problem events in the telemetry, analysis module 102 can access the data values of the other relevant telemetry counters from the telemetry.

From the other relevant telemetry counters and their values during problem events, analysis module 102 can generate a problem fingerprint to detect future occurrences of the problem event. For example, analysis module 102 can generate a problem fingerprint by establishing behavioral parameters for each relevant telemetry counter in the subset based on data values accessed during problem event. Behavioral parameters can include data thresholds and/or data ranges for relevant telemetry counters as well as rules for linking the data thresholds and/or data ranges for relevant telemetry counter to one another. Linkages can include combinations data thresholds and/or data ranges through Boolean logic, dependencies, aggregations, etc. Analysis module 102 can also link the behavioral parameters of the relevant telemetry counters together within the problem fingerprint such that the behavioral parameters are collectively monitored.

Since it is likely that multiple occurrences of the same problem event will present the same fingerprint, problem fingerprints can be used to detect problem events more accurately and in a timelier manner.

In other embodiments, for example, when refining a health model, problem fingerprints are refined from telemetry data and an existing health model. Analysis module 102 can analyze an existing health model to identify a KPI telemetry counter, a KPI threshold or range, the subset of other telemetry counters relevant to the KPI telemetry counter, established behavioral parameters for the other relevant telemetry counters, and how behavioral parameters are linked.

Analysis module 102 can analyze telemetry to identify additional problem event time periods within the telemetry. Analysis module 102 can then access telemetry data values for the subset of relevant telemetry counters for the additional time periods. That is, during additional problem events in the telemetry, analysis module 102 can access the data values of the other relevant telemetry counters from the telemetry.

From the data values of the other relevant telemetry counters, analysis module 102 can refine the problem fingerprint used to detect future occurrences of the problem event. Analysis module 102 can modify established behavioral parameters for the relevant telemetry counters in the subset in view of the data values accessed during the additional problem events. For example, analysis module 102 can increase or decrease thresholds or increase or decrease upper or lower bounds of ranges. Analysis module 102 can also adjust how the behavioral parameters are linked together within the problem fingerprint.

Refinement allows problem fingerprints based on larger sample sets of telemetry data, potentially increasing the accuracy with which a problem event can be detected.

In some embodiments, KPI data for a plurality of different problem events is submitted to analysis module 102. From the KPI data, analysis module 102 can generate a problem fingerprint for each different problem event. During refinement, analysis module 102 can also process additional data values for each problem fingerprint and modify established behavioral parameters for the relevant telemetry counters in each problem fingerprint.

Analysis module 102 can format one or more problem fingerprints for processing by health model generator 103. Health model generator 103 is generally configured to access one or more problem fingerprints and generate a health model from the problem fingerprints. Health model 103 can generate health models that are configured for execution at health modeling system 104. A health model can be configured to monitor relevant data counters in a software service's real-time telemetry for any combination of data values indicative of a problem fingerprint.

Accordingly, through the submission of KPI data for a piece of telemetry, a health model can be automatically generated and periodically refined. A feedback loop is essential set up that uses historical telemetry data to automatically generate and/or refine health models for a health monitoring system. An application expert can also utilize health model generator 103 to annotate problems within a health model that was automatically generated or refined from problem fingerprints.

Figure 2:
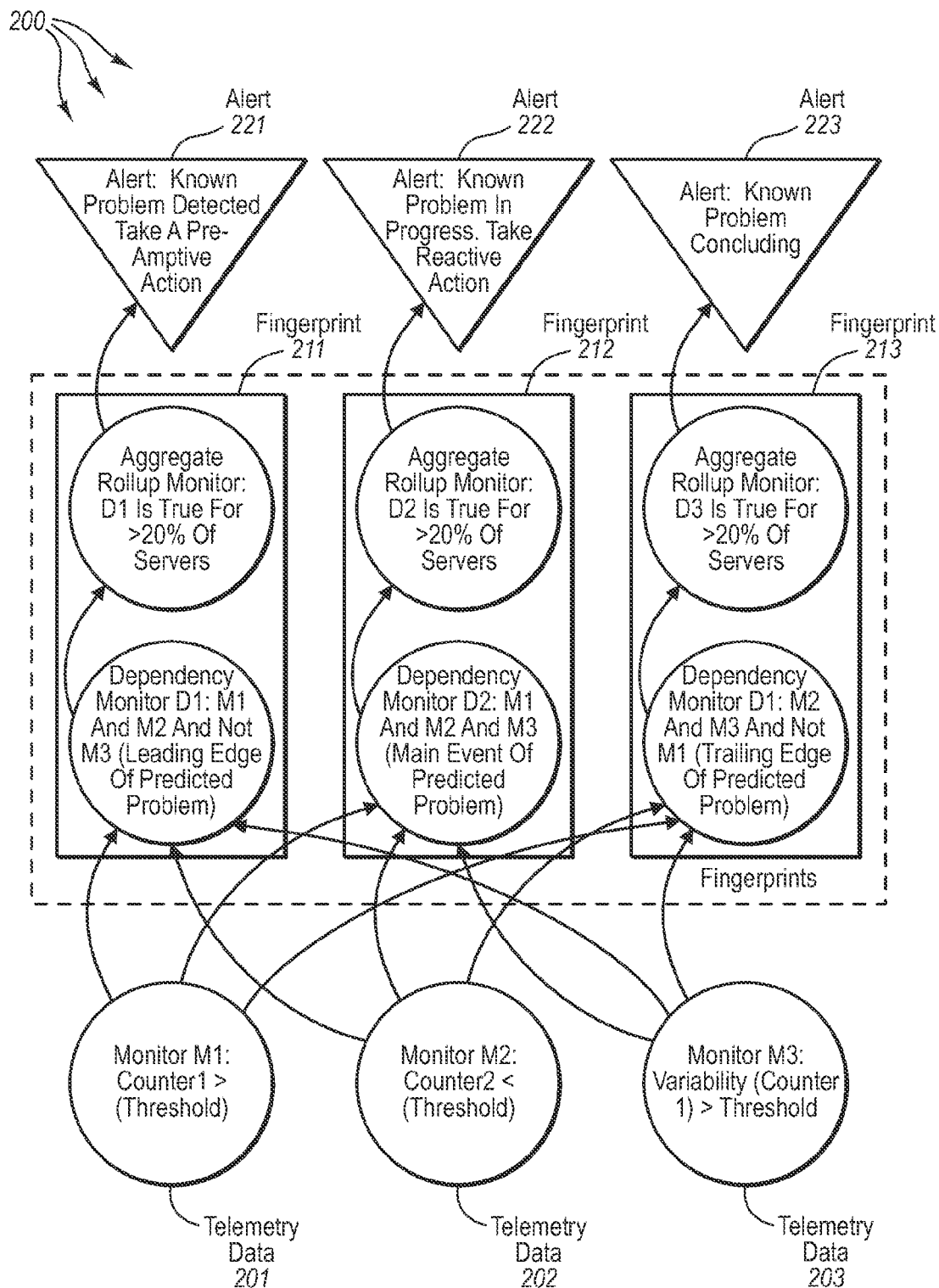
FIG. 2 illustrates an example health model for detecting a problem event.

FIG. 2 illustrates an example health model 200 for detecting a problem event. Generally, three inputs (Counter1, Counter2, and recent-history-of-counter 1), each with a threshold, to determine transitions into and out of the following three states: 1) indicating an increased potential that a problem event is going to occur in the near future (leading edge prediction), 2) indicating that the problem event is likely in progress, and 3) indicating an increased potential that the problems symptoms appear to be clearing up (trailing edge prediction). When not in any of these three sates, health model 200 can implicitly indicate a fourth state that no problem is detected. When a problem state is detected through a fingerprint match, an appropriate alert can be issued. An alert can include one or more of: the fingerprint that has been detected (what pieces of telemetry, what criteria, etc.), what the probability is that a real problem event has been detected (rather than a false alarm, prior dates/times of the problem event, and prior durations of events matching the fingerprint.

Returning to FIG. 2, telemetry data 201, 202, and 203 is identified as the relevant subset of telemetry data for fingerprint 21T1. Thus, fingerprint 211 uses telemetry data 201, 202, and 203 to indicate an increased potential that a problem event is going to occur. As depicted, fingerprint 211 predicts the problem event is going to occur when M1 and M2 are true and M3 is false (i.e., is when counter1 is greater than threshold1, counter2 is less than threshold2, and the variability of counter 3 is less than or equal to threshold3) for more that 20% of the servers providing a software service. When fingerprint 211 predicts that the problem event is going to occur, a corresponding health monitoring system can issue alert 221.

Telemetry data 201, 202, and 203 is identified as the relevant subset of telemetry data for fingerprint 212. Thus, fingerprint 212 uses telemetry data 201, 202, and 203 to indicate that the problem event is likely in progress. As depicted, fingerprint 213 predicts the problem event is in progress when M1, M2, and M3 are true (i.e., is when counter1 is greater than threshold1, counter2 is less than threshold2, and the variability of counter3 is greater than threshold3) for more that 20% of the servers providing a software service. When fingerprint 2112 predicts that the problem event is occurring, a corresponding health monitoring system can issue alert 222.

Telemetry data 201, 202, and 203 is identified as the relevant subset of telemetry data for fingerprint 213. Thus, fingerprint 213 uses telemetry data 201, 202, and 203 to indicate an increased to indicate an increased potential that the problem event is concluding. As depicted, fingerprint 213 predicts the problem event is going to occur when M2 and M3 are true and M1 is false (i.e., is when counter1 is less than or equal to threshold1, counter2 is less than threshold2, and the variability of counter 3 is greater than threshold3) for more that 20% of the servers providing a software service. When fingerprint 211 predicts that the problem event is concluding, a corresponding health monitoring system can issue alert 223.

Figure 3:
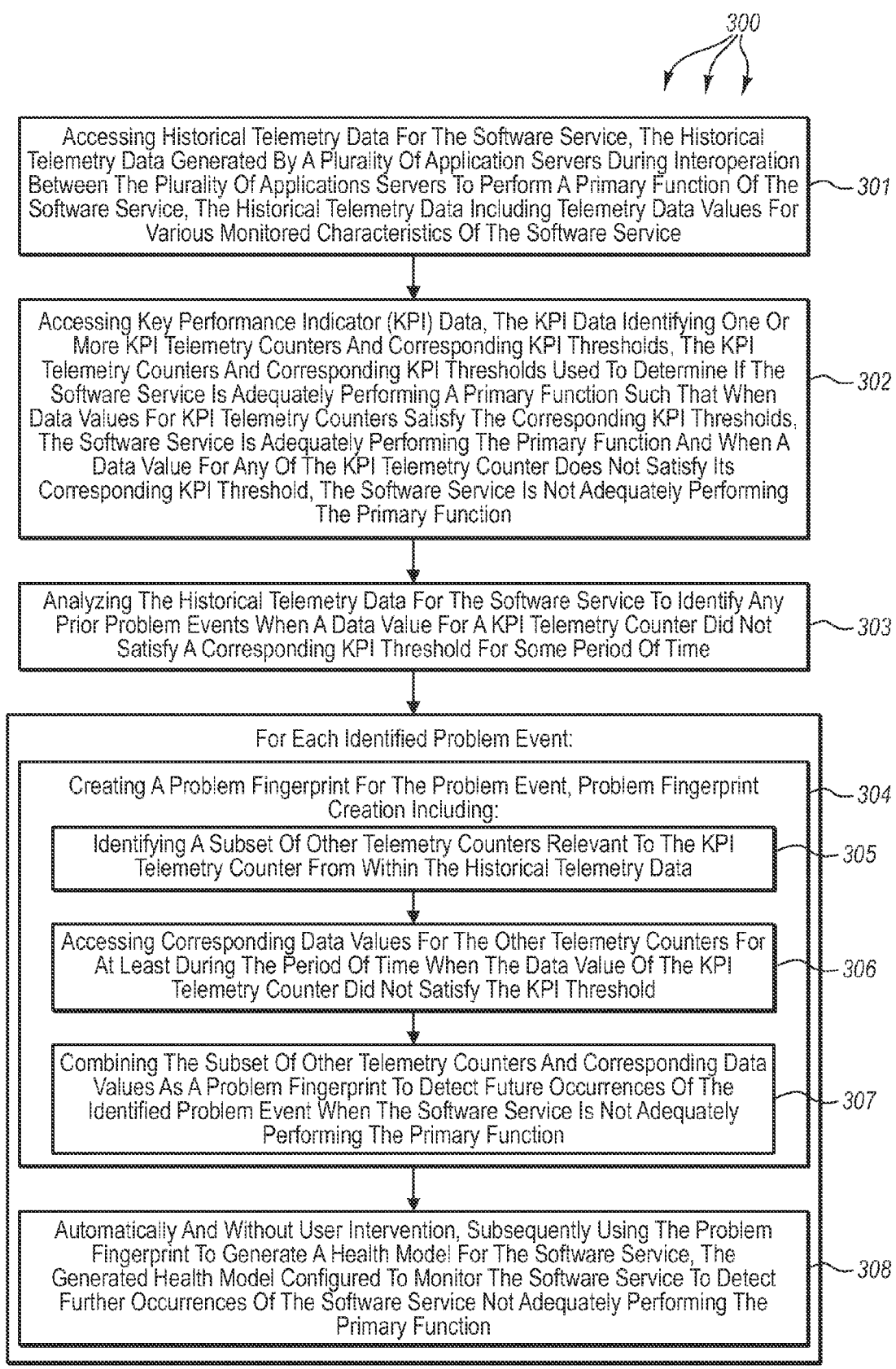
FIG. 3 illustrates a flow chart of an example method for automated health model generation.

FIG. 3 illustrates a flow chart of an example method 300 for automated health model generation. Method 300 will be described with respect to the components and data of computer architecture 100.

Method 300 includes an act of accessing historical telemetry data for the software service, the historical telemetry data generated by a plurality of application servers during inter-operation between the plurality of applications servers to perform a primary function of the software service, the historical telemetry data including telemetry data values for various monitored characteristics of the software service (act 301). For example, analysis module 102 can access telemetry 111 from data warehouse 108. Telemetry data 111 was previously generated by applications services 106 during inter-operation between application servers 106 to provide software service 107. Telemetry data 111 can include telemetry data values for various monitored characteristics of software service 107.

Monitored characteristics can include virtually any measurable portion of data related to the operation of software service 107, such as, for example, message scanning time, processor utilization, memory utilization, data throughout, and network error rate. Monitored characteristics can also include the variability of any measurable portion of data over a time period, such as, for example, data throughput variability. Telemetry 111 can represent name/value pairs. The name can identify a monitored characteristic and the value can indicate the value of the monitored characteristic. Telemetry 111 can also include time/date stamps that indicate when a name/value pair was documented.

Method 300 includes an act of accessing a Key Performance Indicator (KPI) data, the KPI data identifying one or more telemetry counters and corresponding KPI thresholds used to determine if the software service is adequately performing a primary function such that when data values for the KPI telemetry counters satisfy the KPI threshold, the software service is adequately performing the primary function and when a data value for any of the KPI telemetry counters does not satisfy its corresponding KPI threshold, the software service is not adequately performing the primary function (act 302). For example, analysis module 102 can access KPI data 118. KPI data 118 includes KPI telemetry counter 128 and KPI threshold 129. KPI telemetry counter 128 identifies a telemetry counter in telemetry 111 that is to be monitored. KPI threshold 129 represents a threshold that, if satisfied by the data value of the KPI telemetry counter 128, indicates adequate performance of the primary function and if not satisfied by the data value of the KPI telemetry counter 128, indicates inadequate performance.

It may be that a primary function of software service 107 is to scan electronic messages for SPAM and security threats in less than 120 seconds. Thus, KPI telemetry counter 128 can identify a "message scanning time" counter from telemetry 111. KPI threshold 129 can be set to 120 seconds so it can be determined from telemetry 111 when, if ever, software service 107 was taking to long to scan messages.

Method 300 includes an act of analyzing the historical telemetry data for the software service to identify a any prior problem events when a data value did for a corresponding KPI telemetry counter not satisfy the KPI threshold for some period of time (act 303). For example, analysis module 102 can scan telemetry 111 for periods of time when the data value for KPI telemetry counter 128 did not satisfy KPI threshold 129. That is, analysis module 102 can analyze telemetry 111 to identify any previous problem events at software service 107. For example, analysis module 102 can scan telemetry 111 for periods of time when message scanning time exceeded 120 seconds.

For each identified problem event, method 300 includes an act of creating a problem fingerprint for the problem event (act 304). For example, analysis module 102 can create problem fingerprints 113 for the problem event related to software service 107 taking to long to scan messages. Creating a problem fingerprint includes an act of identifying a subset of other telemetry counters relevant to the KPI telemetry counter from within historical telemetry data (act 305). For example, analysis module 102 can identify other telemetry counters relevant to KPI telemetry counter 128 (e.g., message scanning time), such as, for example, a data throughput counter, a data throughput variability counter, and a network error rate counter, from telemetry 111.

Creating a problem fingerprint includes an act of accessing corresponding telemetry data values for the other telemetry counters for at least during the period of time when the data value of the KPI telemetry counter did not satisfy the KPI threshold (act 306). For example, analysis module 102 can access the data values for the data throughput counter, the data throughput variability counter, and the network error rate counter from telemetry 111 for periods of time when software service 107 was taking to long to scan messages.

Creating a problem fingerprint includes an act of combining the subset of other telemetry counters and corresponding telemetry data values as a fingerprint to detect future occurrences of the identified problem event when the software service is not adequately performing its primary function (act 307). For example, data values for the data throughput counter, the data throughput variability counter, and the network error rate counters can be combined into problem fingerprints 113 to detect future occurrences of software service 107 taking to long to scan messages. Problem fingerprints 113 can include behavioral parameters that indicate inadequate timeliness when scanning electronic messages.

Behavioral parameters can include data thresholds and/or data ranges for the data throughput counter, the data throughput variability counter, and the network error rate counters as well as rules for linking the data thresholds and/or data ranges for these telemetry counters to one another. Linkages can include combinations data thresholds and/or data ranges through Boolean logic, dependencies, aggregations, etc. Analysis module 102 can also link the behavioral parameters of the data throughput counter, the data throughput variability counter, and the network error rate counter together within the problem fingerprint such that the behavioral parameters are collectively monitored.

Analysis module 102 can output problem fingerprints 113 for use by health model generator 103. In some embodiments, problem fingerprints are output in a format that is compatible with human based mechanisms for health model generation. For example, health model generator 103 may be configured to process appropriate mark-up language instructions (e.g., eXstensible Markup Language ("XML") instructions) to generate health models. A human user, such as, for example, application expert 122, can generate markup language instructions that are processed by health model generator 103 to create a health model.

Thus, analysis module 102 can output problem fingerprints 113 in the appropriate markup language format that can be processed by health model generator 103 and also further modified by a human user. Application expert 122 can then optionally modify the problem fingerprints or other markup language instructions as desired, prior to generation of a health model. In some embodiments, application expert 122 annotates alert text to be more descriptive. For example, application expert 122 can submit problem annotation 114 to annotate the alert text for alerts generated from problem fingerprints 113.

In some embodiments, created problem fingerprints are evaluated for similarity. When two fingerprints are sufficiently similar to one another, analysis module 102 can conclude that they represent different expressions of the same problem event. Accordingly, analysis module 102 can combine the two fingerprints into a single fingerprint that is representative of the problem event. Combining two fingerprints into a single fingerprint can include combining data values from each time period with behavioral parameters to refine the behavioral parameters for telemetry counters related to the problem event.

For each identified problem event, method 300 includes an act of, automatically and without user intervention, subsequently using the fingerprint to generate a health model for the software service, the generated health model configured to monitor the software service to detect further occurrences of the software service not adequately performing the primary function (act 308). For example, health monitor generator can automatically and without user intervention process problem fingerprints 113 into health model 116. Health model 116 is configured to monitor software service 107 to detect further occurrences of software service 107 taking to long to scan messages.

Health monitoring system 104 can access and load health model 116 to monitor software service 107 for subsequent occurrences of software system 107 taking to long to scan messages. If health monitoring system 104 detects a match to the problem fingerprint for inadequate timeliness in telemetry 111, health monitoring system can issue alert 117. Alert 117 can be of the format:

A known system-wide problem has been detected
Problem ID: #74203
Problem fingerprint: Data throughput <150, Data Throughput Variability >1.5, Network Error Rate >10
Probability of false positive: 1.26%
Probable advance warning: 30 minutes
Historical Problem Duration: 57 Minutes
Historical Problem Occurrences: 2007-10-05 15:43 UTC, 2008-4-19 8:11 UTC When the text for alert 117 has been annotated, alert 117 can be of the annotated format:

A known system-wide problem has been detected
Problem Name Network authentication problems causing work to queue on the database servers
KB Link: http://mytechsupportkb/articles/74203
Problem ID: #74203
Problem fingerprint: Database throughput <150, Database Throughput Variability >1.5,
Network Error Rate >10
Probability of false positive: 1.26%
Probable advance warning: 30 minutes
Historical Problem Duration: 57 Minutes
Historical Problem Occurrences: 2007-10-05 15:43 UTC, 2008-4-19 8:11 UTC The annotated format includes a problem name and a link to support documentation. Administrator 121 can use the information in alert 117 (in either form) to address problem events at software service 107.

Figure 4:
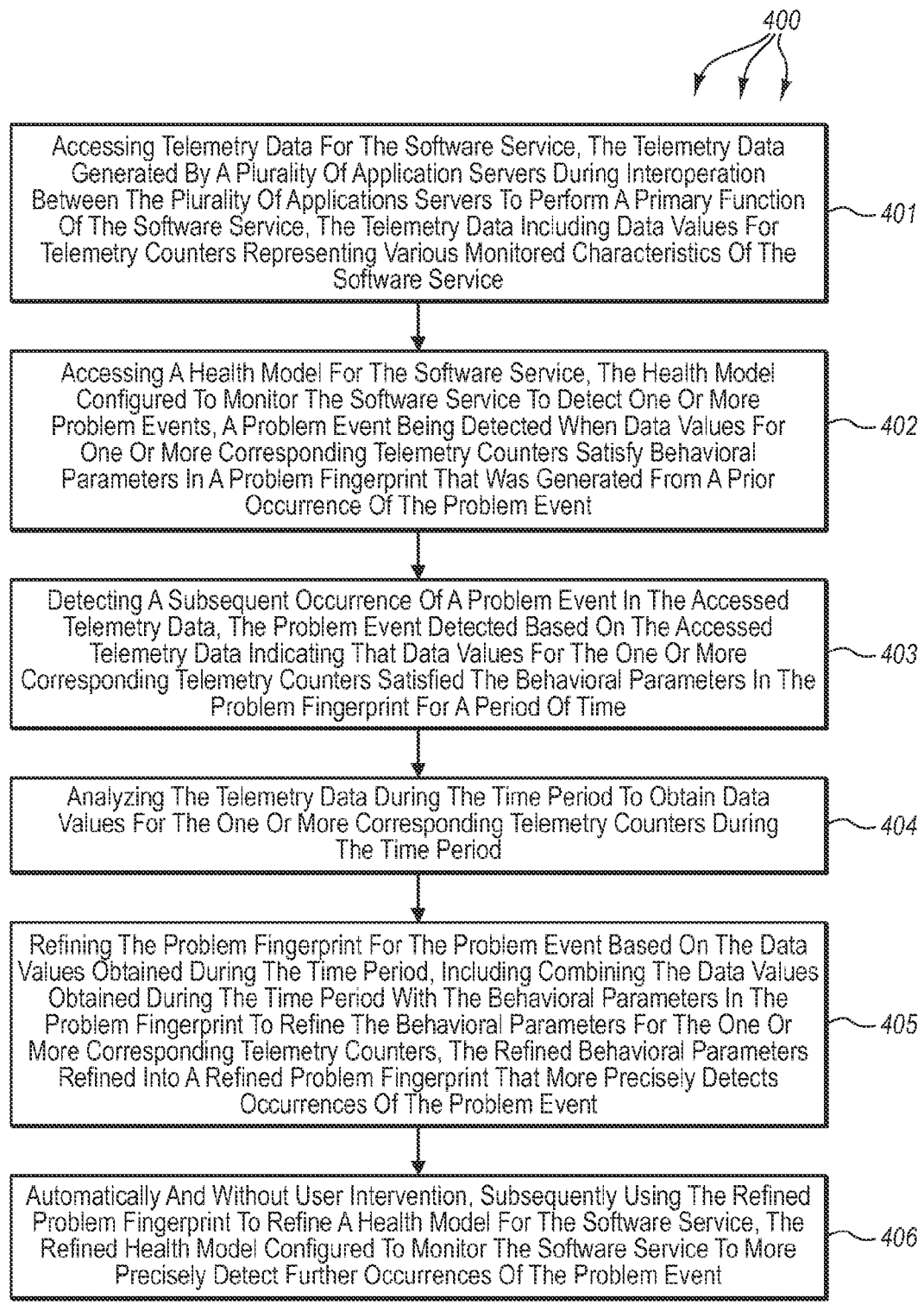
FIG. 4 illustrates a flow chart of an example method for automated health model refinement.

As software service 107 continues to operate, software service 107 generates additional telemetry 112 that can be used to refine existing health models. FIG. 4 illustrates a flow chart of an example method 400 for automated health model refinement. Method 400 will be described with respect to the components and data of computer architecture 100.

Method 400 includes an act of accessing telemetry data for the software service, the telemetry data generated by a plurality of application servers during interoperation between the plurality of applications servers to perform a primary function of the software service, the telemetry data including telemetry data values for telemetry counters representing various monitored characteristics of the software service (act 401). For example, analysis module 102 can access telemetry 112 from data warehouse 108. Telemetry 112 can be telemetry generated during interoperation of application services 106 after deployment of health model 116.

Method 400 includes an act of accessing a health model for the software service, the health model configured to monitor the software service to detect one or more problem events, a problem event being detected when current data values for one or more corresponding telemetry counters satisfy behavioral parameters in a problem fingerprint that was generated from a prior occurrence of the problem event (act 402). For example, analysis module 102 can access health model 116. Health model 116 is configured to monitor software service 107 to detect occurrences of software service 107 taking to long to scan messages. Health model 116 can detect that software service is taking to long to scan messages when data values for corresponding telemetry counters satisfy behavior patterns of problem fingerprints 113.

Method 400 includes an act of detecting a subsequent occurrence of the problem event in the accessed telemetry data, the problem event detected based on the telemetry data values for the one or more corresponding telemetry counters satisfying behavioral parameters of the problem fingerprint for a period of time (act 403). For example, analysis module 102 can scan telemetry 112 to detect a subsequent occurrence of the problem event of software service 107 taking to long to scan messages. Analysis module 102 can detect the problem event based on data values in telemetry 112 satisfying behavioral parameters of problem fingerprints 113 for a period of time.

Method 400 includes an act of analyzing the telemetry data during the time period to obtain data values for the one or more corresponding telemetry counters during the time period (act 404). For example, analysis module 102 can analyze telemetry 112 during the time periods when software service 107 is detected as taking to long to scan messages. From the analysis, analysis module 102 can obtain data values for the other telemetry counters relevant to message scanning time for the time periods.

Method 400 includes an act of refining the problem fingerprint for the problem event based on the data values obtained during the time period, including combining the data values obtained during the time period into the behavioral parameters for the problem fingerprint to refine behavioral parameters for the one or more corresponding telemetry counters, the refined behavioral parameters refined into a refined problem fingerprint that more precisely detects occurrences of the problem event (act 405). For example, analysis module 102 can refine problem fingerprints 113 into refined problem fingerprints 113R based on data values from telemetry 112 for time periods when software service 107 is detected as taking to long to scan messages. Refinement of problem fingerprints 113 can include combining data values from telemetry 112 into the behavioral parameters for problem fingerprints 113.

Combining the data values refines the behavioral parameters into refined behavioral parameters (e.g., tightening or loosening thresholds or ranges in view of the additional data values form telemetry 112). From the refined behavioral parameters, refined problem fingerprints 113 can be formulated.

Refining a problem fingerprint can also include input from an application expert. For example, application expert 122 can submit expert input 122 to analysis module to supplement any automated refinement. Generally, expert input can include instructions alter KPI telemetry counters and/or KPI thresholds. For example, expert input 131 can include instructions to alter (e.g., raise threshold, lower a threshold, contract a range, expand a range, etc). Thus, although fingerprint refinement is primarily an automated process, human input (e.g., from an application expert having experience with health problems for a set of application servers) can still be used to refine problem fingerprints.

Method 400 includes an act of, automatically and without user intervention, subsequently using the refined problem fingerprint to refine a health model for the software service, the refined health model configured to monitor the software service to more precisely detect further occurrences of the problem event (act 406). For example, health model generator can use refined problem fingerprints 113R to generate refined health model 116R. Health model 116R can be configured to monitor software service 107 for subsequent occurrences of software service 107 taking to long to scan messages. Since the behavioral parameters in health model 116R are based on additional data values from telemetry 112, health model 116R can more precisely detect further occurrences of software service 107 taking to long to scan messages as compared to health model 116.

Health monitoring system 104 can access and load health model 116R to monitor software service 107 for subsequent occurrences of software system 107 taking to long to scan messages. Loading health model 116R can replace any instances of health model 116 currently running at health monitoring system 104.

Accordingly, embodiments of the invention use machine learning tools to analyze historical telemetry data from a server deployment. The tools output fingerprints, such as, for example, small groupings of specific metrics-plus-behavioral parameters, that uniquely identify and describes past problem events mined from the historical data. Embodiments automatically translate the fingerprints into health models that can be directly applied to monitoring the running system. Thus, richer and more accurate problem notification is provided to operators than could be achieved with a hand-authored health model.

Fully-automated feedback loops for identifying past problems and giving advance notice as those problems emerge in the future is facilitated without any operator intervention. In some embodiments, a single portion of expert knowledge, for example, KPI data, initiates health model generation. Once initiated, the feedback loop can be fully automated to access further telemetry and refine health models based on the further telemetry.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a computer implemented method for generating a health model for a software service, the computer implemented method comprising:

an act of accessing historical telemetry data for the software service, the historical telemetry data generated by a plurality of application servers during interoperation between the plurality of application servers to perform a primary function of the software service, the historical telemetry data including telemetry data values for various monitored characteristics of the software service;

an act of accessing Key Performance Indicator (KPI) data, the KPI data identifying one or more KPI telemetry counters and corresponding KPI thresholds, the KPI telemetry counters and corresponding KPI thresholds used to determine if the software service is adequately performing a primary function such that when data values for the KPI telemetry counters satisfy the corresponding KPI thresholds, the software service is adequately performing the primary function and when a data value for any of the KPI telemetry counters does not satisfy its corresponding KPI threshold, the software service is not adequately performing the primary function;

an act of analyzing the historical telemetry data for the software service to identify any prior problem events when a data value for a corresponding KPI telemetry counter did not satisfy a corresponding KPI threshold for some period of time;

for each identified problem event:
an act of creating a problem fingerprint for the problem event, problem fingerprint creation including:
an act of identifying a subset of other telemetry counters relevant to the KPI telemetry counter from within the historical telemetry data;
an act of accessing corresponding data values for the other telemetry counters for at least during the period of time when the data value of the KPI telemetry counter did not satisfy the KPI threshold;
an act of combining the subset of other telemetry counters and corresponding data values into a problem fingerprint to detect future occurrences of the identified problem event when the software service is not adequately performing the primary function; and an act of, automatically and without user intervention, subsequently using the problem fingerprint to generate a health model for the software service, the generated health model configured to monitor the software service to detect further occurrences of the software service not adequately performing the primary function.

2. The method as recited in claim 1 wherein the act of accessing historical telemetry data for the software service comprises an act of accessing historical telemetry data for a software service that scans electronic messages for security threats.

3. The method as recited in claim 2, wherein the act of accessing Key Performance Indicator (KPI) data comprises accessing KPI data identifying a KPI telemetry counter for message scanning time and a KPI threshold indicating a permitted scanning time period.

4. The method as recited in claim 3, wherein the act of analyzing the historical telemetry data for the software service to identify a prior problem event comprises an act of analyzing the historical telemetry data to identify a time period when the software services was not scanning messages within the permitted scanning time period.

5. The method as recited in claim 1, wherein the act of accessing historical telemetry data for the software service comprises an act accessing a plurality of name/value pairs, wherein the name in each name/value pair corresponds to a software service characteristic of the software service the value in each name/value pair corresponds the value of the software service characteristic at a specified time.

6. The method as recited in claim 1, wherein accessing historical telemetry data for the software service comprises an act of accessing a historical telemetry data related to one or more of: processor utilization, memory utilization, network throughput, network error rate, and data throughput for the software service.

7. The method as recited in claim 1, wherein the act of combining the subset of other telemetry counters and corresponding data values into a problem fingerprint comprises an act of formulating behavioral parameters for the a subset of other relevant telemetry counters.

8. The method as recited in claim 1, wherein the act of combining the subset of other relevant telemetry counters comprises using one or more of: a) Boolean logic to combine groups of relevant telemetry counters with one another to formulate behavioral parameters and b) aggregation of the relevant telemetry counters across the plurality of application servers to formulate behavioral parameters.

9. The method as recited in claim 1, further comprising:
an act of outputting the problem fingerprint in a format that is compatible with human based mechanisms for health model generation prior to generating the health model.

10. The method as recited in claim 1, further comprising:
an act of receiving human entered annotation to the problem fingerprint prior to generating the health model.

11. At a computer system including one or more processors and system memory, a computer implemented method for refining a health model for a software service, the computer implemented method comprising:

an act of accessing telemetry data for the software service, the telemetry data generated by a plurality of application servers during interoperation between the plurality of applications servers to perform a primary function of the software service, the telemetry data including data values for telemetry counters representing various monitored characteristics of the software service;

an act of accessing a health model for the software service, the health model configured to monitor the software service to detect one or more problem events, a problem event being detected when data values for one or more corresponding telemetry counters satisfy behavioral parameters in a problem fingerprint that was generated from a prior occurrence of the problem event, the problem fingerprint based on KPI data identifying one or more KPI telemetry counters and KPI thresholds;

an act of detecting a subsequent occurrence of a problem event in the accessed telemetry data, the problem event detected based on the accessed telemetry data indicating that data values for the one or more corresponding telemetry counters satisfied the behavioral parameters in the problem fingerprint for a period of time;

an act of analyzing the telemetry data during the time period to obtain data values for the one or more corresponding telemetry counters during the time period;

an act of refining the problem fingerprint for the problem event based on the data values obtained during the time period, problem refinement including:

combining the data values obtained during the time period with the behavioral parameters in the problem fingerprint to refine behavioral patterns for the one or more corresponding telemetry counters, the refined behavioral patterns refined into a refined problem fingerprint that more precisely detects occurrences of the problem event; and adjusting one or more KPI thresholds in response to input from a human user of the computer system; and an act of, automatically and without user intervention, subsequently using the refined problem fingerprint to refine a health model for the software service, the refined health model configured to monitor the software service to more precisely detect further occurrences of the problem event.

12. The method as recited in claim 11, wherein the act of accessing telemetry data for the software service comprises an act of accessing a plurality of name/value pairs, wherein the name in each name/value pair corresponds to a software service characteristic of the software service the value in each name/value pair corresponds the value of the software service characteristic at a specified time.

13. The method as recited in claim 11, wherein accessing telemetry data for the software service comprises an act of accessing a telemetry data related to one or more of: processor utilization, memory utilization, network throughput, network error rate, and data throughput for the software service.

14. The method as recited in claim 11, wherein accessing a health model for the software service comprises an act of accessing a health model configured to monitor how long it takes the software service to scan electronic messages for security threats.

15. The method as recited in claim 14, wherein detecting a subsequent occurrence of a problem event in the accessed telemetry data comprises an act of identify a time period when the software service was taking to long to scan messages.

16. The method as recited in claim 11, wherein the act of analyzing the telemetry data during the time period to obtain data values for the one or more corresponding telemetry counters during the time period comprises an act of obtaining telemetry values for one or more telemetry counters related to: processor utilization, memory utilization, network throughput, network error rate, and data throughput for the software service.

17. The method as recited in claim 11, wherein the act of refining the problem fingerprint for the problem event based on the data values obtained during the time period comprises an act of modifying behavioral patterns for the one or more corresponding telemetry counters, wherein the behavioral patterns include one or more of: a) Boolean logic to combine groups of relevant telemetry counters with one another to formulate the behavioral parameters and b) aggregation of the relevant telemetry counters across the plurality of application servers to formulate the behavioral parameters.

18. A system for monitoring a software service, the system comprising:

a data warehouse, the data warehouse storing telemetry generated during execution of the software service;

a health monitoring system, the health monitoring system configured to run health models to monitor the software system; and an analysis server, the analysis server including: one or more processors, system memory, and one or more computer storage media having stored thereon computer-executable instructions representing an analysis module and computer-executable instructions representing a health model generator, wherein the analysis module is configured to:

access telemetry data for the software service, the telemetry data generated by a plurality of application servers during interoperation between the plurality of applications servers to perform a primary function of the software service, the telemetry data including data values for telemetry counters representing various monitored characteristics of the software service;

access further data indicative of a plurality of events related to a predicted problem that are to be monitored for detection at the software service, the plurality of events including a leading event, a main event, and a trailing edge event for the predicted problem;

analyze the telemetry data to detect one or more occurrences of the predicted problem at the software service;

formulate a problem fingerprint for each of the leading edge event, the main event, and the trailing edge event, including for each of the leading event, the main event, and the trailing edge event:

identifying a subset of other telemetry counters relevant to the predicted problem, from within the historical telemetry data;

accessing corresponding data values for the other telemetry counters for at least during the period of time when the predicted problem was detected; and combining the subset of other telemetry counters and corresponding data values into a problem fingerprint to detect further occurrences of the event;

output the problem fingerprints for each of leading edge event, the main event, and the trailing edge event in a markup language format that is compatible with human based mechanisms for health model generation prior to generating the health model, and wherein the health model generator is configured to:

process the markup language format of the problem fingerprints for each of the leading edge event, the main event, and the trailing edge event to a new version of the health model configured to monitor for leading edge event, the main event, and the trailing edge event of the predicted problem occurring at the software service.

19. The system as recited in claim 18, wherein accessing further data indicative of a plurality of events related to a predicted problem that are to be monitored for detection at the software service comprises an act of accessing KPI data.

20. The system as recited in claim 18, wherein accessing further data indicative of a plurality of events related to a predicted problem that are to be monitored for detection at the software service comprises an act of accessing a current version of the health model.

* * * * *